March 10, 1936.  F. J. LYDEN  2,033,200
SINGLE PHASE MOTOR
Filed Oct. 23, 1933
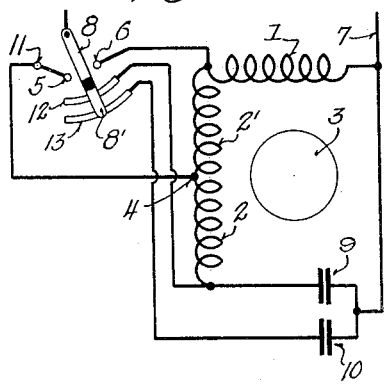
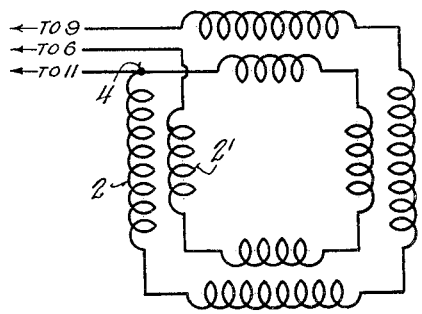
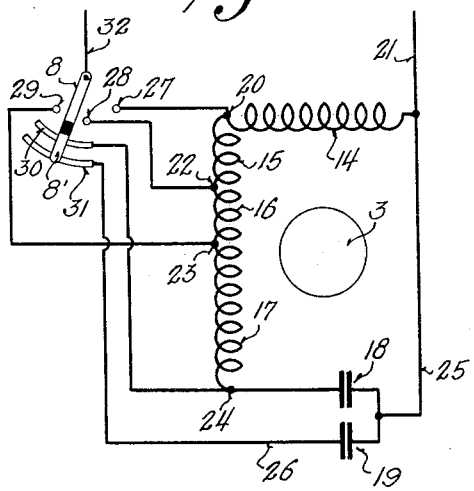
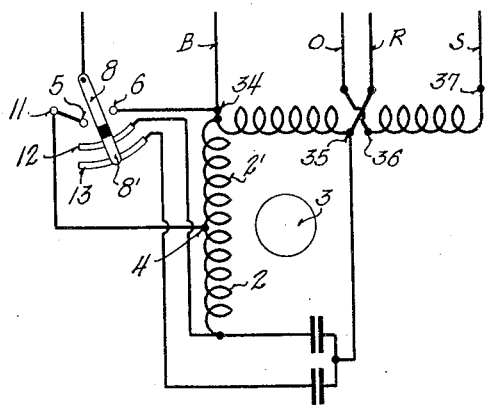
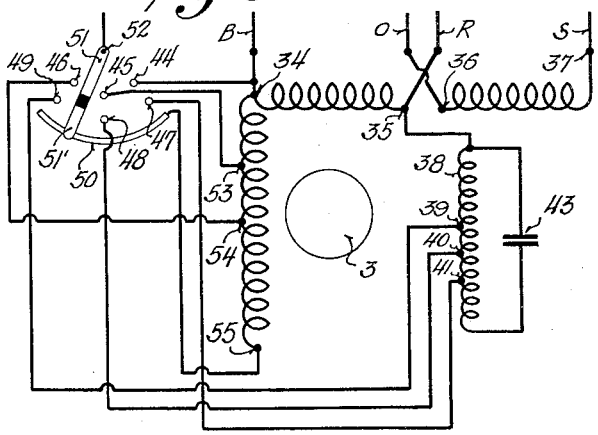
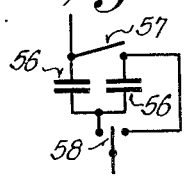
INVENTOR
Frank J. Lyden
BY
ATTORNEY Patented Mar. 10, 1936

2,033,200

UNITED STATES PATENT OFFICE 2,033,200

SINGLE PHASE MOTOR

Frank J. Lyden, Dayton, Ohio

Application October 23, 1933, Serial No. 694,824

11 Claims. (Cl. 172—278)

This invention relates to adjustable varying speed single phase motors.

Objects of this invention are to provide a multiple speed single phase motor in which two, three or more different speeds are possible, in which the characteristics at each speed may be varied to suit the particular demands, and in which a transformer need not be employed, although if desired, an auto-transformer can be employed to vary the condenser effect, for instance, in a manner hereinafter to appear.

Further objects are to provide a construction of a multispeed single phase motor in which two, three or more different speeds are possible, which in some forms may employ a double voltage type of construction.

Further objects are to provide a condenser type motor of multiple speed in which the starting torque may be increased at the lower speeds.

Further objects are to provide a condenser type of motor of multiple speed in which the speed is varied by a change in condenser capacity in the auxiliary phase.

Additional objects of this invention are to provide a condenser type motor which is economical to make, in which there are minimum losses, in which any relation of speeds for a two-speed motor may be secured, or in which any relative ratio of the several speeds may be obtained for a three or more speed motor, and yet to secure these results without a material increase in cost over the usual form of condenser type motors.

In general, objects of this invention are to provide a multiple speed condenser motor which is quiet in operation, which is efficient and has high power factor and may be used in any size desired.

Embodiments of the invention are diagrammatically shown in the following drawing, in which:—

Figure 1 is a diagrammatic view of one form of the invention.

Figure 2 is a diagrammatic view showing the manner of winding one of the phases.

Figure 3 is a diagrammatic view of a further form of the invention.

Figure 4 diagrammatically shows a still further form of the invention.

Figure 5 shows a still further form of the invention and shows the manner in which an auto-transformer may be employed in connection with a condenser.

Figures 6 and 7 are diagrammatic views of further forms of condenser connections.

Referring to Figure 1, it will be seen that the condenser type motor is provided with a main phase 1 and an auxiliary phase 2 displaced approximately 90 or 120 electrical degrees, and the usual squirrel cage or other type rotor 3. It is provided with an intermediate tapped point 4 leading to the points 5 and 11 of a switch, the other point 6 thereof being connected to the point of connection of the two phases 1 and 2. The contact 12 of the switch is connected to the last end of the auxiliary phase 2 and the contact 13 connects to one side of the condenser 10. The other side of the phase 1 is connected to the line, as indicated at 7, and the switch arm 8, consisting of two conducting portions 8 and 8' which are insulated from each other, has one portion 8 connected to the line. Thus the motor is adapted for single phase operation. A pair of condensers 9 and 10 are provided, one of which 9 is connected in series with the phase 2 and the line 7. The lead of the condenser 10 is connected to 7 and the other lead to the contact 13 of the control switch.

This motor has three speeds. If the switch arm 8 is on the "high" position, connecting the line to 6 and connecting 12 to 13, the two condensers are connected in parallel and the motor runs as an ordinary condenser motor.

As soon as the switch arm 8 is moved to the next contact point (medium speed), namely 5, the line connects to 5, and 12 is still connected to 13. The speed will be lower because some turns 2' of the auxiliary phase are connected in series with the main phase, thus reducing the torque of the motor. When the contact point is moved to the last position (low speed), the condenser 10 is cut out and only the condenser 9 is effective, which will reduce the motor torque some more, causing a still lower speed than the second or medium speed.

The manner of winding the second phase 2 is shown in Figure 2. The winding 2 is shown for a four-pole motor and it will be seen that the winding is in reality two separate windings, each winding covering 360 degrees. For example, the winding 2', which is in reality the upper portion of the winding as indicated in Figure 1, is the additional portion of the auxiliary winding which is put in the same slots with the main portion thereof, and which has the same polarity for the respective poles as the main portion thereof.

It is, therefore, clear that a variable speed motor is secured by this manner of constructing the motor without requiring any auxiliary winding outside of the motor or independent thereof, but that in actual operation, the winding itself is utilized in the peculiar manner outlined to secure the different speeds. Two or more taps may be employed to get additional speeds and in addition, the condenser capacity may be decreased in combination with one or more taps.

It can be shown that the displacement in space between the main phase with a portion of the auxiliary turns added in effective series with the main phase, will always be one-half of the original displacement between the main phase and the whole of the auxiliary phase.

The change in condenser capacity with different speeds may be used for another reason than lowering the speed. It may be found necessary to increase the starting torque at the lower speeds, which can be accomplished by adding condenser capacity at the medium or low speed or both. This is shown in Figure 3, in which the motor has a main phase 14 and an auxiliary phase divided in three parts 15, 16 and 17, which are wound in the same manner as shown in Figure 2, and has a pair of condensers 18 and 19 and the usual squirrel cage rotor 3.

A three speed switch is used. This switch has a movable portion having two conducting portions 8 and 8' insulated from each other, three contact points 27, 28 and 29, and a pair of contacts 30 and 31. When the switch is in the first position (high speed) it connects 32 to 27. When in the second position (medium speed) it connects 32 to 28, and 30 to 31. When in the third position (low speed) it connects 32 to 29, and 30 to 31.

The last end of the main phase connects to the line and the other end to the switch point 27 and also to the first end of the auxiliary phase. The condenser 18 is in series with the auxiliary phase. The other side of the condenser 18 is connected by the conductor 25 to the line 21. The tapped points of the auxiliary phase connect to the control switch, namely, 22 to 28, and 23 to 29. One lead of the condenser 19 connects to 25, the other lead 26 to the contact 31. The contact point 30 is connected to 24, the end of the auxiliary phase, and the arms 8 and 8', which are insulated, swing around the pivot point, which latter goes to the other line 32.

In the first position 15, 16 and 17 are used as the auxiliary phase and only condenser 18, resulting in high speed. At the second position, the main phase is weakened by the added auxiliary phase 15 and in order to increase the starting torque, the condenser 19 is added to the condenser 18. The third position adds still more turns to the main phase and also uses both condensers in parallel.

It is also possible to arrange this motor as a double voltage motor having a ratio of two to one, which is shown in Figure 4. The connections are exactly the same as the one shown in Figure 1, with the exception of the main phase which is wound in two parts in the same manner as shown in Figure 2, each part having the same number of turns, that is 34, 35 having equal turns as 36, 37. With voltages 110/220, for instance, the 110 volt connection is: B and O together, and R and S together. R and S are connected to one line and B and O are connected to the other point 6.

The motor shown in Figure 3 can be made in the same manner.

The same or a different arrangement of condensers may be employed. In Figure 5 an arrangement using an autotransformer 38 with taps 39, 40 and 41 and a condenser is used. Effective condenser capacity can be changed by using different taps. The method shown is the same as the one shown in Figure 3, that is, the condenser capacity is increased at medium and at low speed but is increased more at the low speed. The motor is also arranged for double voltage.

It is to be noted that the taps 39, 40 and 41 respectively connect to the switch points 49, 48 and 47, and that the lower end 55 of the auxiliary phase connects to the annular contact 50. The switch points 46 and 45 connect respectively to the taps 54 and 53 of the auxiliary phase. The switch arm has the parts 51' and 51 insulated from each other and is pivoted about the point 52 which is connected to the line.

It is also possible to use a series parallel connection of double and triple type condensers to be used either for increased starting torque at lower speeds (increased effective condenser capacity), or for obtaining lessening of speed (decreasing effective condenser capacity). These forms of condenser arrangements are shown in Figures 6 and 7 respectively, and may be used as desired.

For example, in Figure 6 the condensers 56 may be thrown in series or in parallel by manipulating the switches 57 and 58.

In Figure 7 the condensers 59 may be arranged in any relation, for example, in series by opening the switches 60 and 61 and in parallel by closing the switches.

It is clear that either a double or single voltage arrangement could be used for this motor, as previously described.

It will be seen that the characteristics of the motor at any speed may be selected as desired by varying the condenser effect and by varying the point at which the auxiliary phase is connected. For example, the increase or decrease of the effective condenser capacity depends on the characteristics desired. Sometimes the condenser capacity is increased at medium or low speed, giving more starting torque. Sometimes the effective condenser capacity is decreased at medium or low speed, giving lower medium and low speed.

It will be seen that no auxiliary transformer is required for varying the voltage impressed on the motor, and consequently all losses due to such transformer are avoided, as well as the additional expense of this construction.

Further, it will be seen that a highly efficient condenser type variable speed motor is obtained by this construction and one in which the characteristics at any speed may be selected as desired.

It is to be noted particularly that the invention does not employ any auxiliary winding or any auxiliary apparatus to vary the voltage impressed on the motor.

It is also to be noted that speed variation with tapped winding is not limited to condenser motors, but in general to single phase motors having an auxiliary phase, as the condenser is merely a starting device, though the fact is appreciated that a condenser motor is superior to other single phase motors. A motor having a tapped auxiliary phase may be started by any suitable means, such as resistance or capacity producing means, for example.

It will be seen that a novel form of single phase alternating current single phase motor has been provided by this invention which is an adjustable, varying speed motor and which has no commutator or sliding contacts, and which is, therefore, free from producing radio interference.

It is to be noted that speed variation with tapped winding alone may be used without a change in condenser capacity, or there may be a change in condenser capacity at any or all speeds.

Although this invention has been described in considerable detail, it is to be understood that such description is intended as illustrative rather than limiting, as the invention may be variously embodied and is to be interpreted as claimed.

I claim:

1. A single phase alternating current motor having a main winding and an auxiliary winding and having a rotor, said auxiliary winding being formed in a plurality of complete parts, each part having the same polarity for the respectively associated portions thereof, capacity producing means in series with at least part of said auxiliary winding, and switching means for connecting at least one of the said parts of said auxiliary winding in effective series with the main winding for varying the speed, said switching means having a plurality of positions, said capacity producing means being changed with different switch positions.

2. A single phase adjustable varying speed alternating current motor having a main winding and an auxiliary winding and a rotor, capacity producing means in the circuit of said auxiliary winding, said motor having a plurality of poles, said auxiliary winding being formed in a plurality of parts with the parts thereof at the same poles of the same polarity, and switching means for connecting all of the parts of said auxiliary winding in series with said capacity producing means and in parallel with said main winding in one position of said switching means, and for connecting at least a part of said auxiliary winding in series with said main winding in another position of said switching means, the remaining part of the auxiliary phase being in series with the capacity producing means and in parallel with the main phase, said main phase including the added auxiliary winding, said capacity producing means being changed with the different switch positions to provide a different effective capacity in said last mentioned position of said switching means than in the first mentioned position of said switching means.

3. A single phase adjustable varying speed alternating current motor, comprising a main winding, an auxiliary winding and a rotor, said main winding being formed in two parts having an equal number of turns, each part having the same polarity for the respectively associated portions, switching means for connecting said parts either in series or in parallel, said auxiliary winding having a tapped point, switching means for connecting all of said auxiliary winding to said source or for connecting a part of said auxiliary winding to said source and the remaining part thereof in effective series with said main winding, and means for producing a capacity effect in the circuit of said auxiliary winding, said auxiliary winding being in series with said means for producing a capacity effect and being in parallel with half of the turns of said main winding.

4. A single phase adjustable varying speed alternating current motor, comprising a main winding, an auxiliary winding and a rotor, said main winding being formed in two parts, switching means for connecting said parts either in series with a source of power or for connecting said parts in parallel and to said source, said auxiliary winding having a tapped point, switching means for connecting all of said auxiliary winding to said source or for connecting a part of said auxiliary winding to said source and the remaining part thereof in effective series with said main winding, and means for producing a capacity effect in the circuit of said auxiliary winding, said means being variable, whereby any desired capacity effect may be produced.

5. A single phase adjustable varying speed alternating current motor, comprising a main winding, an auxiliary winding and a rotor, said main winding being formed in two parts having an equal number of turns, each part having the same polarity for the respectively associated portions, switching means connecting said parts in series or in parallel, said auxiliary winding having a tapped point, switching means for connecting all of said auxiliary winding to said source or for connecting a part of said auxiliary winding to said source and the remaining part thereof in effective series with said main winding, means for producing a capacity effect in series with said auxiliary winding, said auxiliary winding and said means being in parallel with half of the turns of said main winding, said switching means when in the last mentioned position increasing the capacity effect produced by said capacity effect producing means.

6. In a single phase, adjustable varying speed, alternating current motor having two members, one of said members having a squirrel cage winding thereon and the other of said members having a main phase winding and an auxiliary phase winding and condenser means, a power line, said main winding being adapted for connection to said line, said auxiliary winding being connected in series with said condenser means and in parallel with said main winding, and switch means for conductively connecting a part of the auxiliary phase in effective series with the main phase to vary the speed of said motor.

7. A single phase, adjustable varying speed, alternating current motor having a main winding and having an auxiliary winding provided with a plurality of distinct sections and having a rotor, capacity producing means in the circuit of said auxiliary winding, and switching means having a plurality of positions, said switching means in certain positions connecting different numbers of said auxiliary winding in effective series with said main winding, whereby sections of said auxiliary winding may be successively added in series to said main winding to vary the speed of the motor through a wide range.

8. A single phase alternating current motor having a main winding and a tapped sectional auxiliary winding and having a rotor, phase displacing means in circuit with the auxiliary winding, and switching means for connecting all of said auxiliary winding and said phase displacing means in a series circuit and connecting said last mentioned circuit in parallel with said main winding in one position for one speed, and for connecting a portion of the auxiliary winding in effective series with the main winding in another position for varying the speed.

9. A single phase alternating current motor having a main winding and an auxiliary winding and having a rotor, said auxiliary winding being formed in at least two complete parts, each part having the same polarity for the respectively associated portions thereof, phase displacing means in series with said auxiliary winding, and switching means for connecting all of said auxiliary winding and said phase displacing means in a series circuit and connecting said circuit in parallel with the main winding in one position and for one speed, and for connecting at least one of said parts of the auxiliary winding in effective series with the main winding in another position for varying the speed.

10. A single phase alternating current motor having a main winding, a tapped sectional auxiliary winding having at least two sections and having a rotor, starting means in the circuit of said auxiliary winding, and switching means for connecting one section of the auxiliary winding in series with the main winding when said switching means is in one position to produce one effect of the turns in the main winding, and for removing said last mentioned section of said auxiliary winding from the circuit of said main winding when said switching means is in the other position, a portion at least of said auxiliary winding being in effective parallel with said main winding in at least one position of said switching means.

11. In a single phase alternating current motor having a main winding and an auxiliary winding displaced at an angle to each other and connected in circuits of different time phase characteristics, said auxiliary winding being tapped and having at least two portions, and switching means for connecting a section of the auxiliary winding in series with the main winding for producing one effect of the turns in the main winding when said switching means is in one position, and for removing said last mentioned section of said auxiliary winding from said main winding when said switching means is in another position for producing a different effect.

FRANK. J. LYDEN.